United States Patent [19]

McMaster et al.

[11] Patent Number: 4,515,622
[45] Date of Patent: May 7, 1985

[54] GLASS SHEET QUENCH INCLUDING OPPOSITELY ANGLED JETS

[75] Inventors: Harold A. McMaster, Woodville; Robert G. McMaster, Elmore; Ronald A. McMaster, Woodville, all of Ohio

[73] Assignee: Glasstech, Inc., Perrysburg, Ohio

[21] Appl. No.: 492,687

[22] Filed: May 9, 1983

[51] Int. Cl.³ ............................................. C03B 27/04
[52] U.S. Cl. ....................................... 65/351; 65/114; 65/348
[58] Field of Search ........................... 65/351, 348, 114

[56] References Cited

U.S. PATENT DOCUMENTS

| | | | |
|---|---|---|---|
| 2,968,126 | 1/1961 | Richardson | 65/348 |
| 3,125,430 | 3/1964 | Richardson | 65/348 X |
| 3,476,542 | 11/1969 | Ritter, Jr. | 65/351 X |
| 4,140,511 | 2/1979 | Imler | 65/351 X |

Primary Examiner—Arthur Kellogg
Attorney, Agent, or Firm—Brooks & Kushman

[57] ABSTRACT

An improved glass sheet quench (14) is disclosed as including opposed blastheads (26,28) each of which includes elongated plenum housings (34) including openings (42) positioned therealong in a spaced relationship and oriented to supply jets (44) of quenching gas angularly in opposite directions from the plenum housing toward a heated glass sheet therebetween for impingement therewith to cool the glass sheet. This angular supply of the quenching jets permits the use of half as many plenum housings as is ordinarily needed such that the plenum housings can be spaced farther from each other to provide a greater flow area for spent quenching gas to escape from between the blastheads. Flat glass embodiments of the quench (14,14a) and bent glass embodiments of the quench (14' 14a) are disclosed and may incorporate sheet metal and tube plenum housings (34) or drilled metal bar plenum housings (34').

17 Claims, 10 Drawing Figures

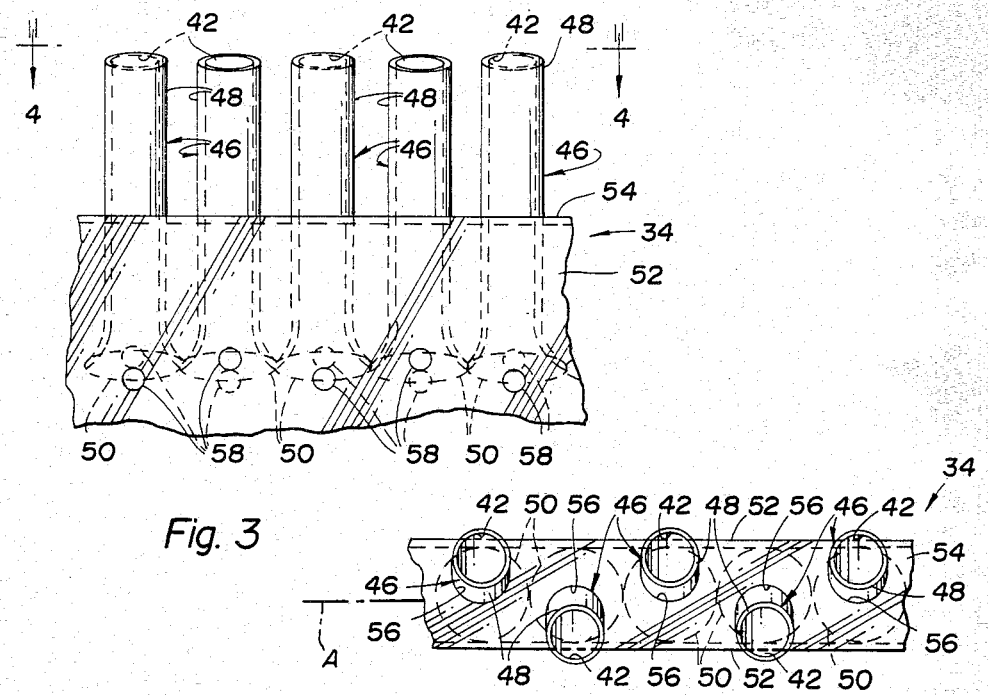
Fig. 3
Fig. 4
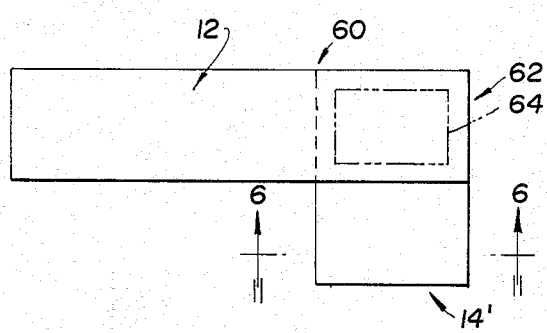
Fig. 5
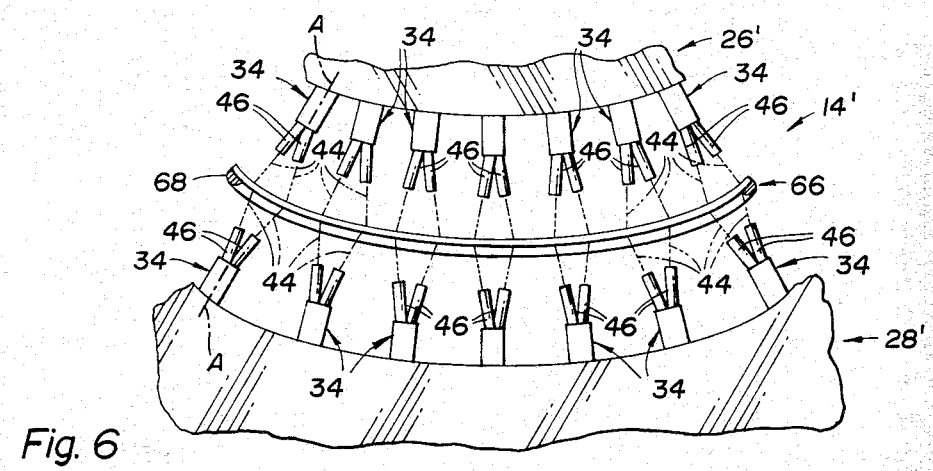
Fig. 6

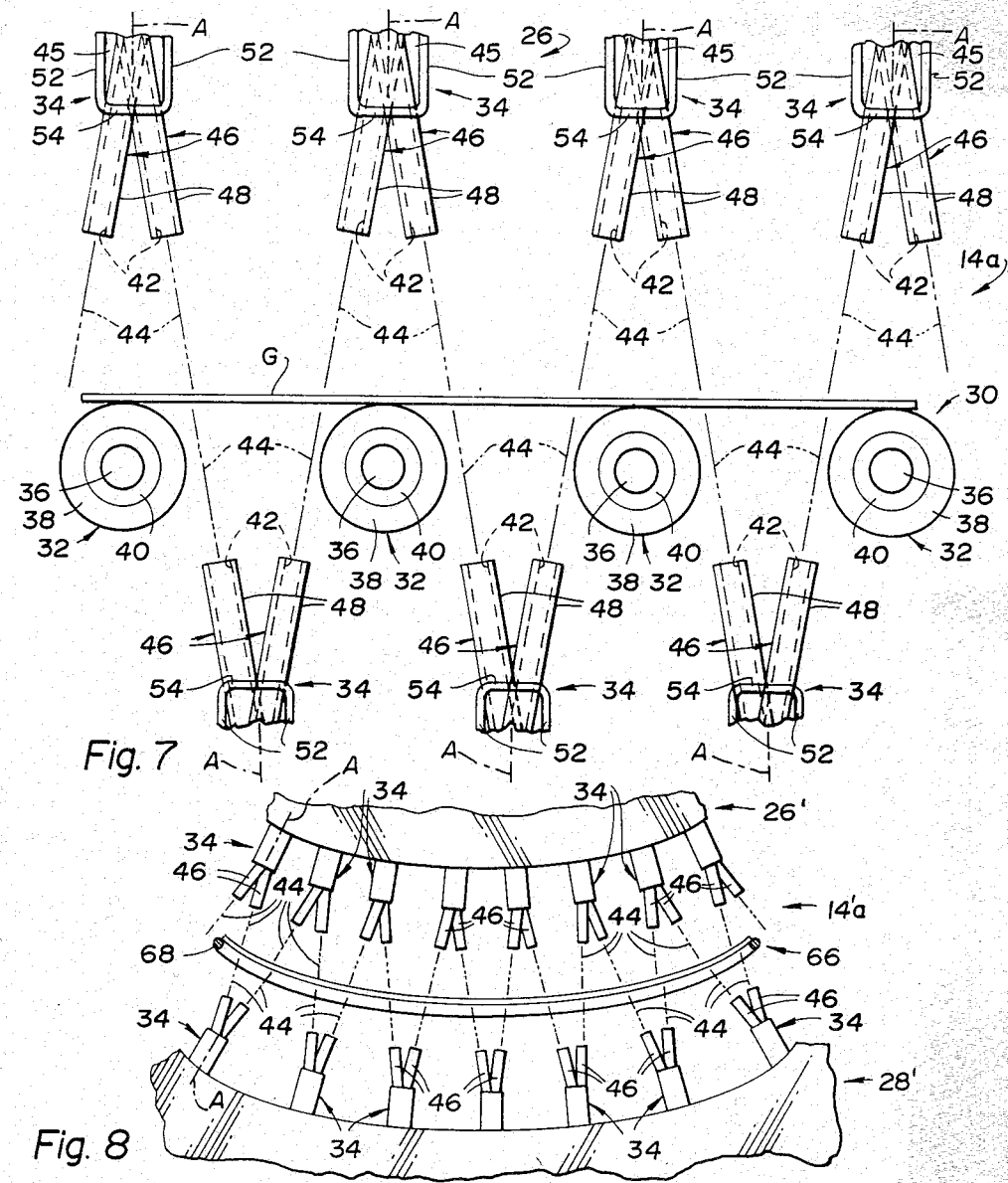
Fig. 7
Fig. 8
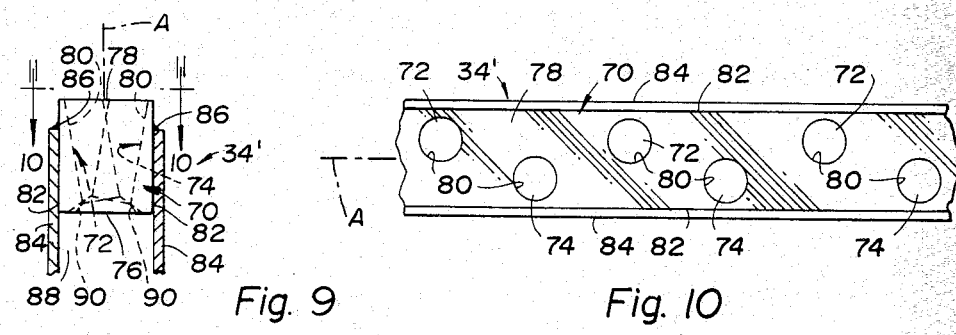
Fig. 9
Fig. 10

GLASS SHEET QUENCH INCLUDING OPPOSITELY ANGLED JETS

TECHNICAL FIELD

This invention relates to an improved glass sheet quench including opposed blastheads between which a heated glass sheet is positioned for impingement by quenching gas to provide cooling thereof such as is performed during tempering and heat strengthening both flat and bent glass sheets to improve the mechanical properties of the glass

BACKGROUND ART

Glass sheets are quenched to provide tempering or heat strengthening in order to increase the mechanical strength of the glass and hence provide an increased resistance to breakage as compared to annealed glass. In tempering, quenching gas is impinged with the opposite surfaces of the glass sheet to provide rapid cooling thereof such that the finally cooled glass sheet has compressive forces at its surfaces and tensile forces at its center and is thereby stronger and more resistant to breakage. Also, tempered glass has the characteristic of breaking into small dull pieces as compared to the sharp slivers that result when annealed glass is broken. With heat strengthening, quenching gas is also impinged with the opposite surfaces of the glass sheet, but at a much lower rate and thereby provides the surfaces of the glass with compressive forces but at a much lower level than is involved with tempering. Both tempering and heat strengthening can be performed on flat glass sheets such as are conventionally used for architectural purposes and on bent glass sheets such as are conventionally used for vehicle windows.

Glass sheet quenches conventionally include opposed blastheads each of which has elongated plenum housings that are spaced from each other and supply pressurized quenching gas to a heated glass sheet positioned between the blastheads. The plenums are spaced from each other to leave room for spent quenching gas to flow away from the glass sheet and between the plenums for flow out from between the blastheads. Normally the quenching gas is supplied in discrete jets that are spaced along the length of each plenum housing as disclosed by U.S. Pat. No. 3,936,291. Such discrete jets are preferable to an elongated slit through which the quenching gas is supplied as disclosed by U.S. Pat. No. 2,948,990 wherein deflectors are also provided for controlling the direction of gas supplied through such slits. Normally quenching jets are supplied in a parallel relationship to each other to provide tempering of flat glass sheets which are positioned between the opposed blastheads of the quench extending in a perpendicular relationship to the quenching jets. Likewise, quenching of bent glass sheets can also be performed with the quenching jets arranged in a parallel relationship to each other or the quenching jets can be arranged in a generally perpendicular relationship to the bent glass sheets as disclosed by U.S. Pat. No. 3,939,062.

One problem that results in attempting to provide a greater degree of cooling to glass sheets is that a pressure buildup results from the spent quenching gas which cannot escape from between the blastheads through which the quenching gas is supplied. This is a particular problem with quenching of flat glass sheets on roller hearth conveyors as disclosed by U.S. Pat. Nos. 3,806,312, 3,934,970, 3,947,242, and 3,994,711, since the lower side of the glass sheet being quenched is obstructed by conveyor rolls which reduce the area for gas to escape and thereby generate a greater pressure buildup of the spent quenching gas. However, this pressure buildup can also be a problem with quenching of bent glass sheets on an open center mold ring in the manner disclosed in U.S. Pat. No. 4,282,026. In quenching both flat and bent glass sheets, a greater degree of quenching gas must be supplied as the glass sheets become thinner such that the buildup of spent quenching gas is a greater problem than is the case with thicker glass sheets.

In quenching glass sheets, it is important to maintain uniform gas flow and pressures so as to prevent any significant variation in pressure over the surface of the glass sheet being quenched or any variation from one sheet to the next sheet. It is also desirable for quenching gas to flow as efficiently as possible through the blastheads to the glass sheets in order to reduce the energy input necessary to perform the quenching.

DISCLOSURE OF INVENTION

An object of the present invention is to provide an improved glass sheet quench of the type including opposed blastheads each of which includes elongated plenum housings which are spaced from each other and supply pressurized quenching gas to a heated glass sheet positioned between the blastheads. In carrying out this object, the improved quench has a construction which reduces the pressure buildup of spent quenching gas between the blastheads so as to provide effective tempering while also providing efficient gas flow so as to provide an energy efficient quench.

In the improved glass sheet quench according to the invention, each elongated plenum housing of the blasthead has openings positioned therealong in a spaced relationship to each other and oriented to supply jets of quenching gas in opposite angular directions from the plenum housing toward a heated glass sheet between the blastheads for impingement of the gas jets angularly with the glass sheet. This angular supply of the quenching jets permits the use of half as many plenum housings as is ordinarily needed such that the plenum housings can be spaced farther from each other to provide a greater flow area for spent quenching gas to escape from between the blastheads. Also, when used with a roller conveyor that supports the glass sheets during tempering, the angular supply of the quenching jets permits impingement thereof against the lower glass surface closer to the roll centerlines than can be accomplished with vertical jets.

In one preferred construction, each plenum housing has a sheet metal construction that defines a plenum for receiving pressurized quenching gas. Each plenum housing also includes tubes having outer ends that define the openings through which the quenching gas is supplied and having inner ends received within the plenum housing. Within the plenum defined by the plenum housing, the inner end of each tube has a converging shape toward the outer end thereof to provide efficient gas flow during the quenching.

The sheet metal construction of each plenum housing includes a pair of side walls extending parallel to each other and also includes an end wall that connects the side walls along the length of the plenum housing. The end wall of each plenum housing includes holes through which the tubes extend between their inner and outer ends. Welds secure the inner ends of the tubes to each of the side walls. One set of the holes in the end wall of each plenum housing is located closer to one of the side walls thereof and another set of the holes in the end wall is located closer to the other side wall such that the tubes extending through the one set of holes supply the quenching gas in an opposite angular direction as the tubes extending through the other set of holes. The two sets of holes in the end wall of each plenum housing are preferably arranged in an alternating relationship along the length of the plenum housing such that the jets of quenching gas are alternately directed in opposite angular directions from the plenum housing. between their inner and outer ends, the tubes preferably have straight shapes and also preferably have their inner ends each provided with a curved shape that converges toward the outer end. The end wall of each plenum housing extends in a perpendicular relationship to the side walls thereof to which the curved inner ends of the straight tubes are welded to maintain the angular relationship thereof with the tubes extending through the two sets of holes.

In another preferred construction, each plenum housing includes an elongated metal bar extending along the length thereof and having a rectangular cross section. Angular holes are provided through the bar preferably by a drilling operation. The holes have outer ends which provide the openings through which the angular jets of quenching gas are supplied. Each hole also has an inner end that converges toward the outer end thereof to facilitate the flow of quenching gas through bar. Sheet metal walls are secured to the bar in a suitable manner such as by welding to cooperate therewith in defining a plenum that receives pressurized quenching gas which is fed through the holes. First and second sets of the angular holes extend in opposite angular directions as each other and are arranged in an alternating relationship. The jets of quenching gas from the upper and lower blastheads impinge with the glass sheet in an aligned relationship.

One disclosed embodiment of the improved glass sheet quench includes opposed upper and lower blastheads and a roller conveyor having rolls positioned between the blastheads to convey glass sheets horizontally through the quench for cooling by the quenching gas. At least some and preferably all of the gas jets are directed to angle toward the rolls. The manner in which quenching gas is supplied angularly by the plenum housings of each blasthead permits the spent quenching gas to escape from between the blastheads much more easily than with prior blasthead constructions. This is particularly desirable at the lower surface of the glass sheet where the presence of the conveyor rolls reduces the escape area. The greater spacing between the plenum housings of the lower blastheads also provides more room for removing cullet that drops down between the conveyor rolls. A suitable deflector can also be positioned between the tubes to prevent the tubes from catching cullet as it drops down between the conveyor rolls. Also, as previously mentioned, the angular jets of quenching gas permits impingement thereof against the lower surface of the glass sheet closer to the centerlines of the rolls than can be accomplished with vertical jets.

Another disclosed embodiment of the improved glass sheet quench includes opposed upper and lower blastheads and a shuttle having a curved mold of the open center ring type for positioning a heated and bent glass sheet between the blastheads for cooling by the angled jets of quenching gas. With this quench construction, the elongated plenum housings of the blastheads extend parallel to the bend axis to simplify construction by permitting the use of straight plenums. Also, the plenum housings on the concave side of the glass sheet are located closer to each other than the plenum housings on the convex side of the glass sheet.

Both the roller conveyor embodiment of the quench for quenching flat glass sheets and the embodiment for quenching bent glass sheets have the plenum housings of the blastheads positioned to align the impingement of the gas jets from each blasthead with the glass sheet in an aligned relationship with the impingement of the gas jets from the other blasthead. This alignment of the locations of gas jet impingement with the opposite surfaces of the glass sheet can be provided by aligning the plenum housings of each blasthead with those of the other blasthead or by providing the plenum housings on the blastheads in a staggered relationship. Also, the plenum housings are positioned such that the locations of quenching gas jet impingement define a uniform pattern on the glass surfaces, e.g. with the impingement locations equally spaced from each other along a direction transverse to the plenum housings.

The objects, features, and advantages of the present invention are readily apparent from the following detailed description of the best modes for carrying out the invention when taken in connection with the accompanying drawings.

BRIEF DESCRIPTION OF DRAWINGS

FIG. 3 is an elevation view of one of the plenum housings taken along the direction of line 3—3 in FIG. 2;

FIG. 4 is a top plan view of the illustrated plenum housing taken along the direction of line 4—4 in FIG. 3;

FIG. 5 is a top plan view of a glass sheet bending and tempering system including another embodiment of a quench constructed in accordance with the present invention;

FIG. 6 is an enlarged elevation view taken along the direction of line 6—6 in FIG. 5 through a quench to illustrate the manner in which angled jets of quenching gas are provided to quench a heated and bent glass sheet;

FIG. 7 is a view similar to FIG. 2 of a modified quench utilized with a roller conveyor but having the plenum housings of the upper and lower blastheads thereof arranged in a staggered relationship rather than in an aligned relationship;

FIG. 8 is a view of a modified quench used to cool a heated and bent glass sheet and having plenum housings of the upper and lower blastheads thereof arranged in a staggered relationship rather than in an aligned relationship;

FIG. 9 is an end view taken partially in section of an alternate embodiment of the plenum housing; and FIG. 10 is a plan view of the modified plenum housing taken along the direction of line 10—10 in FIG. 9.

BEST MODES FOR CARRYING OUT THE INVENTION

Figures 1, 2:
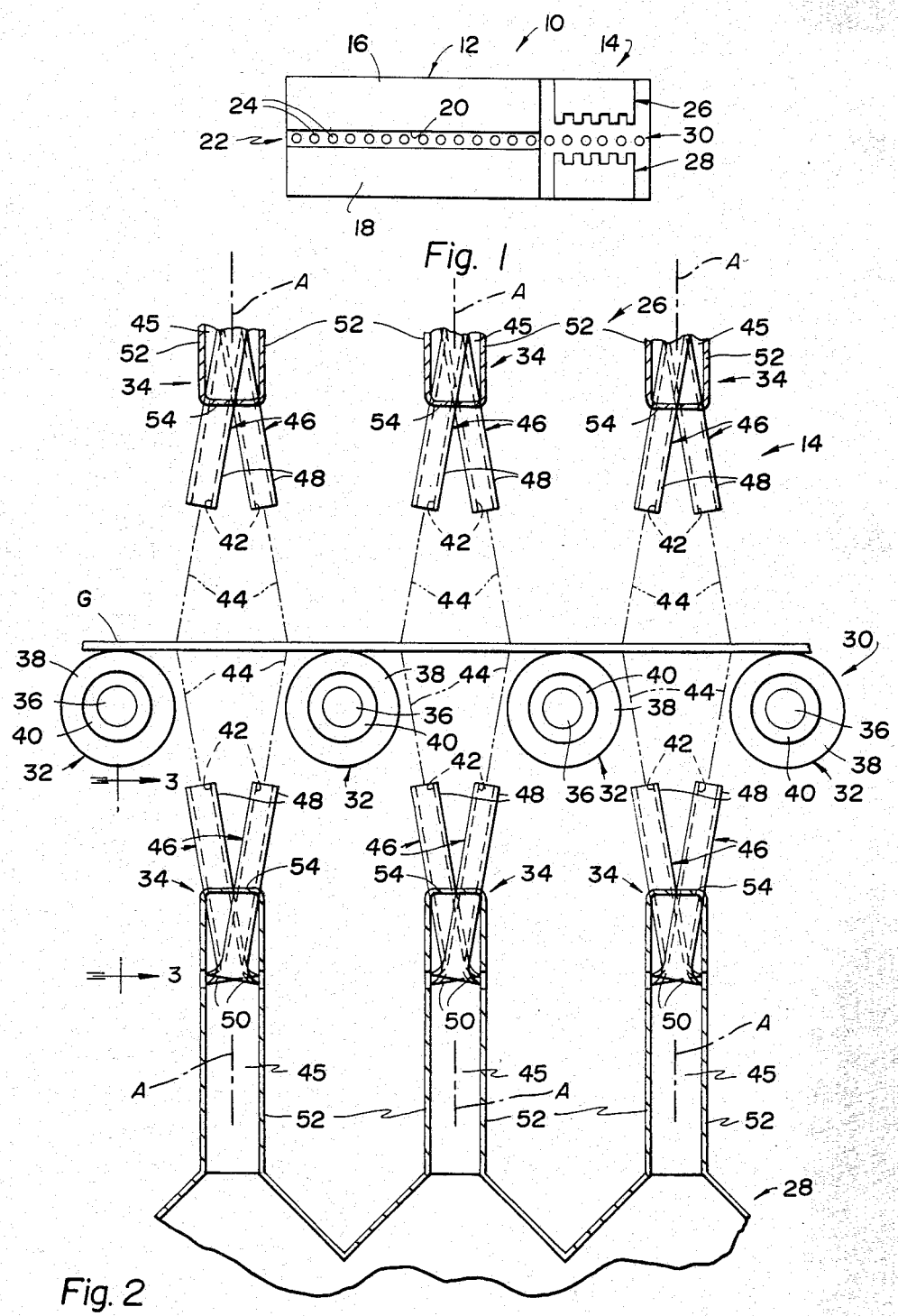
FIG. 1 is a schematic side elevation view of a glass tempering system including a quench constructed in accordance with the present invention.
FIG. 2 is an enlarged view of the quench whose upper and lower blastheads include plenum housings constructed in accordance with the present invention to supply angled jets of quenching gas to a flat glass sheet carried on a roller conveyor between the blastheads.

Referring to FIG. 1 of the drawings, a glass tempering system generally indicated by 10 includes a furnace 12 for heating flat glass sheets to a sufficiently high temperature for tempering and also includes a quench 14 that is constructed in accordance with the present invention to provide quenching that tempers the heated glass sheets as is hereinafter fully described. Furnace 12 is preferably of the type disclosed by U.S. Pat. Nos. 3,934,970, 3,947,242, and 3,994,711 so as to include an upper housing 16 and a lower housing 18 that cooperatively define side slot 20 at the opposite lateral sides of the furnace. A roller conveyor 22 of the furnace 12 includes conveyor rolls 24 whose opposite ends project outwardly through the furnace side slots 20 for frictional driving in the manner disclosed by the aforementioned patents. A flat glass sheet to be heated is introduced into the furnace 12 through an access opening at its left end and is conveyed within a suitably heated interior chamber by the conveyor rolls 24 for heating to a sufficiently high temperature for subsequent tempering upon leaving the furnace through an exit opening at its right end adjacent the quench 14. It should also be mentioned that the quench 14 can be utilized to provide heat strengthening of glass sheets by delivering a lower volume flow rate of quenching gas than that necessary to perform the tempering.

With combined reference to FIGS. 1 and 2, the quench 14 includes upper and lower opposed blastheads 26 and 28 and also includes a roller conveyor 30 having conveyor rolls 32 for conveying a heated flat glass sheet G (FIG. 2) between the blastheads for quenching. Each conveyor roll 32 includes a central shaft 36 with high temperature discs 38 spaced therealong and held in position by suitable washer clamps 40. Plenum housings 34 are spaced from each other and supply pressurized quenching gas to the heated glass sheet G positioned between the blastheads on the roller conveyor 30 in a manner which is hereinafter more fully described.

With combined reference to FIGS. 2 and 3, each elongated plenum housing 34 has a central plane A includes openings 42 positioned therealong in a spaced relationship to each other and oriented to supply jet 44 (FIG. 2) of quenching gas angularly in opposite directions from the plenum housing toward the heated glass sheet G for impingement therewith to cool the glass sheet. The manner in which the quenching gas jets 44 are supplied angularly from the plenum housings 34 permits the housings to be spaced farther from each other than would otherwise be possible so as to increase the area therebetween to which the spent quenching gas flows for flow out from between the upper and lower blastheads 26 and 28. This is especially important at the lower side of the glass sheet G where the conveyor rolls 32 are located and partially obstruct the area where the spent quenching gas escapes downwardly after impingement with the heated glass sheet. Also, the upwardly directed angular gas jets 44 from the lower blasthead 28 can impinge with the lower surface of the glass sheet G closer to the centerlines of rolls 32 than can be accomplished with vertical gas jets. The greater distance between the plenum housings 34 of the lower blasthead 28 as a result of the angular jets 44 also provides increased space for removal of cullet that drops downwardly from the conveyor 30 between the rolls 32.

As illustrated in FIG. 2, each plenum housing 34 has a sheet metal construction defining a plenum 45 that receives pressurized quenching gas from a suitable blower. Straight tubes 46 of each plenum housing have outer ends 48 that define the openings 42 through which the quenching gas is supplied angularly as previously described. Inner ends 50 of the tubes 46 are received within the plenum housings 34 and each has a curved converging shape toward the outer end thereof to provide efficient gas flow during the quenching operation.

As illustrated by the lower blasthead 28 shown in FIG. 2, each of the plenum housings 34 includes a pair of side walls 52 extending parallel to the central plane A and to each other and, each plenum housing also includes an end wall 54 connecting these side walls and extending in a perpendicular relationship to the side walls. Each end wall 54 includes holes 56 (FIG. 4) through which the tubes 46 extend between their inner and outer ends. Within the plenum housings 34, the inner ends 50 of the tubes 46 are secured by welds 58 (FIG. 3) to each of the side walls 52 so as to cooperate with the positioning provided by the holes 56 in locating the tubes. One set of each of the holes 56 in end wall 54 is located as illustrated in FIG. 4 closer to one of the side walls 52, while another set of holes 56 in the end wall is located closer to the other side wall 52 such that the tubes 46 extending through the one set of holes supply the quenching gas in an opposite angular direction as the tubes extending through the other set of holes.

With combined reference to FIGS. 2 and 4, the two sets of holes 56 in the end wall 54 of each plenum housing 34 are arranged in an alternating relationship along the length of the plenum housing with each hole 56 located closer to one of the side walls 52 and the next hole 56 located closer to the other side wall 52. This construction of the plenum housings positions tubes 46 such that the jets of quenching gas are alternately directed in opposite angular directions from the plenum housing as illustrated in FIG. 2 to provide the advantages previously discussed.

Plenum housings 34 of the upper and lower blastheads 26 and 28 are also positioned as illustrated in FIG. 2 in alignment with each other to align the impingement of the angular gas jets 44 from each blasthead against the glass sheet G in an aligned relationship with the impingement of the gas jets from the other blasthead. The spacing between the locations of impingement of the jets 44 associated with each plenum housing 34 is also preferably equal to the spacing between the impingement of the adjacent gas jets 44 from adjacent blastheads so that the quenching is performed in a uniform pattern over the entire extent of the glass sheet. This spacing of the locations of impingement depends not only on the vertical spacing between the upper and lower blastheads but also on the angular relationships of the first and second sets of tubes which extend angularly from the plenum housings in opposite directions as previously described. As illustrated, the angular jets of quenching gas 44 define an included angle just slightly less than 20 degrees when viewed in a crosswise direction as shown. However, it is to be understood that the included angle can vary from this nominal value depending upon the particular construction involved.

Also, to meet certain standards, the downwardly flowing gas jets 44 from the upper blasthead 26 are directed toward the centerlines of rolls 32. The upwardly flowing gas jets 44 from the lower blasthead 28 are then directed to impinge against the lower surface of the glass sheet G in an unaligned relationship with the jets from the upper blasthead. Such tempering produces a glass break pattern without any long pieces and with a particle count that is neither too large nor too small.

It should also be mentioned in connection with FIG. 2 that a suitable deflector such as in the form of an elongated rod can be positioned between the upper ends 48 of the tubes 46 extending along the length of the associated plenum housing 34. Such a deflector will prevent cullet that drops downwardly between the rolls 32 of the conveyor 30 from being caught by the tubes and thereby ensnarling the lower blasthead with cullet.

With reference to FIG. 5 of the drawings, a glass bending and tempering system generally indicated by reference numeral 60 includes a furnace of 12 identical to the furnace previously described and also includes a bending station 62 preferably of the type disclosed by U.S. Pat. No. 4,282,026. A quench 14′ of the system 60 receives a heated and bent glass sheet from the bending system station 62 and is constructed in accordance with the present invention to provide angular jets of quenching gas for tempering of the glass sheet.

Bending station 62 of the bending and tempering system 60 illustrated in FIG. 5 includes a vacuum holder 64 that receives a heated glass sheet from the furnace conveyor and supports the glass sheet above the conveyor in preparation for bending or curving. A shuttle 66 illustrated in FIG. 6 includes a curved mold 68 of the open center ring type that is movable to beneath the glass sheet suspend on the holder 64 to receive the glass sheet therefrom upon termination of the vacuum drawn at the holder. As the glass sheet is released, it drops downwardly onto the mold and curves to the shape of the mold. The shuttle 66 moves the mold to the quench 14′ for the tempering of the bent glass sheet.

With reference to FIG. 6, the quench 14′ includes upper and lower curved blastheads 26′ and 28′ each of which includes elongated plenum housings 34 which are spaced from each other and supply pressurized quenching gas to a heated and bent glass sheet G positioned between the blastheads on the curved mold 68. Plenum housings 34 have the same construction as previously described in connection with the flat glass tempering system disclosed by FIGS. 1 through 4. As such, the previous description of the plenum housings 34 it also applicable to quench 14′ utilized to quench bent glass sheets and need not be repeated. The plenum housings 34 of the upper and lower blastheads 26′ and 28′ of quench 14′ extend parallel to the axis of curvature to permit the use of straight plenum housings for quenching bent glass. These straight plenum housings are positioned in alignment with each other to align the impingement of the gas jets 44 from each blasthead against the glass sheet in an aligned relationship with the impingement of the gas jets from the other blasthead. Such positioning aligns the opposed plenum housings 34 along radii of the curvature of the bent glass sheet G. The sets of gas jets 44 from each plenum housing 34 on one blasthead thus impinge with the glass sheet in alignment with the sets of gas jets 44 from an associated plenum housing of the other blasthead. As such, the plenum housings 34 on the upper blasthead 26′ which is located at the concave side of the glass sheet G are spaced closer to each other than the plenum housings 34 of the lower blasthead 28′ located adjacent the convex side of the bent glass sheet G. Also, it will be noted that the spacing between the impingement of the gas jets 44 from each plenum housing 34 is equal to the spacing between the adjacent gas jets 44 from the adjacent plenum housings 34 such that the locations of impingement are equally spaced along the entire extent of the glass sheet.

Provision of the plenum housings 34 for supplying the angled quenching gas jets 44 has particular utility at the concave side of the bent glass sheet G illustrated in FIG. 6 where there is less room to supply the quenching jets than on the other convex side where the lower blasthead 28′ is located. By use of the angular jets fed from the plenum housings 34, there is still sufficient room between the plenum housings for the spent quenching gas to flow away from the bent glass sheet and then outwardly from between the blastheads 26′ and 28′ without building up too great of a back pressure which would inhibit the outward flow of spend quenching gas and hence the effectiveness of the quenching operation. Also, the quench 14′ uses straight plenum housings 34′ extending parallel to the bend axis and is thereby capable of tempering bent glass sheets while still having an uncomplicted construction.

With reference to FIG. 7, a modified embodiment of the quench 14a has the same construction as the quench 14 previously described in connection with FIG. 2 except as will be noted. Quench 14a has the plenum housings 34 of its upper and lower blastheads 26 and 28 arranged in a staggered relationship as opposed to an aligned relationship as with the previously described quench. The downwardly and upwardly directed quenching gas jets 44 impinge with the upper and lower surfaces of the glass sheet G in an aligned relationship as with the previously described embodiment of the quench for tempering flat glass sheets. Thus, each plenum housing 34 supplies one set of gas jets 44 that impinge with the glass sheet in alignment with gas jets from one plenum housing of the other blasthead and also supplies another set of gas jets that impinge with the glass sheet in alignment with gas jets from another plenum housing of the other blasthead. This construction differs from the earlier described quench 14 wherein both sets of quenching jets 44 from each plenum housing on each blasthead are aligned with the jets from another plenum housing on the other blasthead. In all other respects, quench 14a is the same as the previously described quench 14 such that the previous description is applicable and no repetition thereof is necessary.

With reference to FIG. 8, another embodiment of the quench 14′a is illustrated and has a similar construction to the quench 14′ previously described in connection with FIG. 6. Quench 14′a has the plenum housings 34 on the upper and lower blastheads 26′ and 28′ arranged in a staggered relationship similar to the construction described above in connection quench 14a illustrated in FIG. 7. Thus, the jets of quenching gas 44 from each plenum housing 34 on each blasthead 26′ and 28′ impinge with the bent glass sheet in an aligned relationship with sets of quenching gas from two other adjacent plenum housings on the other blasthead. In all other respects the quench 14′a is identical to the quench 14′ previously described such that the previous description is applicable and no repetition thereof is necessary.

A modified embodiment of the plenum housings is identified by reference numeral 34′ in FIGS. 9 and 10 and includes an elongated metal bar 70 of a straight shape that extends along the length of the plenum housing. First and second sets of angular holes 72 and 74 extend through the bar 70 between inner and outer surfaces 76 and 78 of the bar. These holes 72 and 74 are preferably formed by a drilling operation and extend angularly with respect to the rectangular cross section of the bar 70. Outer ends of the holes 72 and 74 have openings 80 through which angular jets of quenching gas are supplied to provide tempering in the manner previously described. Plenum housing 34' can thus be utilized in each of the embodiments to replace the plenum housings 34 previously described.

As seen in FIG. 9, the bar 70 has side surfaces 82 engaged by a pair of sheet metal walls 84 that are secured thereto by welds 86. Walls 84 and the bar 70 cooperate to define a plenum 88 that receives pressurized quenching gas which is fed through the angular sets of holes 72 and 74. It will be noted that each of the holes 72 and 74 has an inner end 90 that converges towards its outer end so as to facilitate gas flow from the plenum 88 into the holes in an energy efficient manner. At their outer ends as illustrated in FIG. 10, the openings 80 defined by the oppositely directed sets of angular holes are located in an alternating relationship with one opening closer to one of the side surfaces 82 of the bar 70 and with the next opening located closer to the other side surface.

It should also be noted that the plenum housing 34' shown in FIGS. 9 and 10 can be provided with tubes positioned within the holes 72 and 74 of the bar 70. These tubes extend outwardly from bar 70 and have outer ends that define the openings through which the quenching gas flows.

While the best modes for carrying out the invention have been described in detail, those familiar with the art to which this invention relates will recognize various alternatives designs and embodiments for practicing the invention as defined by the following claims.

What is claimed is:

1. In a glass sheet low pressure quench including opposed blastheads each of which includes elongated plenum housings which are spaced from each other and supply pressurized quenching gas to a heated glass sheet positioned between the blastheads, the improvement comprising: each elongated plenum housing having a central plane and including a pair of planar side walls that extend parallel to the central plane thereof and to each other; an end member that extends between the planar side walls of each plenum housing; and openings positioned along the end member of each plenum housing in a spaced relationship to each other and oriented to supply jets of quenching gas angularly in both directions with respect to the central plane from the plenum housing toward the heated glass sheet for impingement therewith to cool the glass sheet.

2. A quench as in claim 1 which includes upper and lower blastheads and conveyor rolls located between the blastheads, and at least certain of the gas jets being directed to angle toward the rolls.

3. A quench as in claim 1 which includes curved blastheads each of which has straight plenums extending parallel to the axis of curvature thereof, and means for positioning a curved glass sheet between the blastheads.

4. A quench in claim 3 wherein the straight plenums are more closely spaced on the concave side of the curved glass sheet and more widely spaced on the convex side thereof to give a substantially uniform pattern of opposed impingement points of the gas jets with the glass surfaces.

5. A quench as in claim 1, 2, 3 or 4 wherein each plenum housing has a sheet metal construction defining a plenum that receives pressurized quenching gas, each plenum housing including tubes having outer ends that define the openings through which the quenching gas is supplied and having inner ends received within the plenum housings, and the inner end of each tube having a converging shape toward the outer end thereof to provide efficient gas flow.

6. A quench as in claim 5 wherein each plenum housing includes an end wall embodying the end member connecting the side walls along the length of the plenum housing, the end wall of each plenum housing including holes through which the tubes extend, welds that secure the inner ends of the tubes to each of the side walls, and one set of the holes in the end wall being located closer to one of the side walls and another set of the holes in the end wall being located closer to the other side wall such that the one set of tubes extending through the one set of holes supply the quenching gas in one direction with respect to the central plane of the plenum housing and such that the other set of tubes extending through the other set of holes supply the quenching gas in the other angular direction with respect to the central plane of the plenum housing.

7. A quench as in claim 6 wherein the two sets of holes in the end wall of each plenum housing are arranged in an alternating relationship along the length of the plenum housing such that the jets of quenching gas are alternately directed in each angular direction from the plenum housing with respect to the central plane of the plenum housing.

8. A quench as in claim 1, 2, 3, or 4 wherein each plenum housing includes an elongated metal bar embodying the end member thereof and having a rectangular cross section, angular holes through the bar, and the holes having outer ends which provide the openings through which the angular jets of quenching gas are supplied.

9. A quench as in claim 8 wherein each plenum housing includes planar sheet metal walls that embody the side walls thereof and are secured to the bar to cooperate therewith in defining a plenum that receives pressurized quenching gas that is fed through the angular holes in the bar to provide cooling of the glass sheet, and each hole having an inner end that converges toward the outer end thereof to facilitate the flow of quenching gas through the bar.

10. In a glass sheet low pressure quench including opposed upper and lower blastheads each of which are spaced from each other and supply pressurized quenching gas to a heated glass sheet between the blastheads, and a roller conveyor including rolls positioned between the blastheads to convey heated glass sheets through the quench for cooling by quenching gas, the improvement comprising: each plenum housing having a central plane and including straight tubes spaced along the length of the plenum housing with first and second sets of tubes extending angularly in both directions with respect to the central plane of the plenum housing; each tube including an outer end having an opening through which quenching gas is supplied from the plenum housing to the heated glass sheet; each tube having an enlarged inner end received within the plenum housing and converging toward the outer end thereof; each plenum housing having a sheet metal construction defining a plenum that receives pressurized quenching gas; each plenum housing including a pair of planar side walls extending parallel to the central plane thereof and to each other and also including an end wall connecting the side walls; welds that connect the side walls of each plenum housing to the inner ends of the tubes thereof; the end wall of each plenum housing including holes through which the tubes extend between their inner and outer ends; and one set of holes of each end wall being located closer to one of the associated side walls and another set of the holes being located closer to the other side wall to position the first and second sets of tubes for supplying jets of quenching gas angularly in both directions with respect to the central plane of the plenum housing toward a heated glass sheet on the roller conveyor for impingement therewith to cool the glass sheet.

11. In a glass sheet low pressure quench including opposed upper and lower blastheads each of which includes elongated plenum housings which are spaced from each other and supply pressurized quenching gas to a heated glass sheet between the blastheads, and a roller conveyor including rolls positioned between the blastheads to convey heated glass sheets through the quench for cooling by the quenching gas, the improvement comprising: each plenum housing having a central plane and including straight tubes spaced along the length of the plenum housing with first and second sets of the tubes extending therefrom in an alternating relationship angularly in both directions with respect to the central plane of the plenum housing; each tube including an outer end having an opening through which quenching gas is supplied from the plenum housing to the heated glass sheet; each tube having an enlarged inner end received within the plenum housing and converging with a curved shape toward the outer end thereof; each plenum housing having a sheet metal construction defining a plenum that receives pressurized quenching gas; each plenum housing including a pair of planar side walls extending parallel to the central plane thereof and to each other and also including an end wall connecting the side walls and extending in a perpendicular relationship to the side walls; welds that connect the side walls of each plenum housing to the inner ends of the tubes thereof; the end wall of each plenum housing including holes through which the tubes extend between their inner and outer ends; one set of the holes of each end wall being located closer to one of the associated side walls and another set of the holes being arranged in an alternating relationship with the one set of holes and being located closer to the other side wall to position the tubes for supplying jets of quenching gas angularly in both directions with respect to the central plane from the plenum housing toward a heated glass sheet on the roller conveyor for impingement therewith to cool the glass sheet; and the plenum housings of the blastheads being positioned to align the impingement of the gas jets from each blasthead with the glass sheet in an aligned relationship with the impingement of the gas jets from the other blasthead.

12. In a glass sheet low pressure quench including opposed upper and lower blastheads each of which includes elongated plenum housings which are spaced from each other and supply pressurized quenching gas to a heated glass sheet between the blastheads, and a roller conveyor including rolls positioned between the blastheads to convey heated glass sheets through the quench for cooling by the quenching gas, the improvement comprising: each plenum housing having a central plane and including an elongated metal bar extending along the length of the plenum housing; the elongated metal bar of each plenum housing having a rectangular cross section along the length thereof; first and second sets of angular holes extending through the bar in both angular directions with respect to the central plane of the plenum housing; the first set of holes extending through the bar in an angular relationship in one direction with respect to the rectangular cross section thereof and with respect to the central plane of the plenum housing; the second set of holes extending through the bar in an angular relationship in the other direction with respect to the rectangular cross section thereof and with respect to the central plane of the plenum housing as the first set of holes; each hole having an outer end including an opening through which pressurized quenching gas from the plenum housing is supplied in a jet toward the heated glass sheet on the roller conveyor for impingement with the glass sheet to provide cooling thereof; the jets of quenching gas from the first and second sets of holes flowing angularly in both directions with respect to the central plane from the plenum housing; and each plenum housing including a pair of planar sheet metal walls extending parallel to the central plane thereof and to each other and being secured to the bar thereof to cooperate therewith in defining a plenum that supplies pressurized quenching gas to the first and second sets of holes in the bar.

13. In a glass sheet low pressure quench including opposed upper and lower blastheads each of which includes elongated plenum housings which are spaced from each other and supply pressurized quenching gas to a heated glass sheet between the blastheads, and a roller conveyor including rolls positioned between the blastheads to convey heated glass sheets through the quench for cooling by the quenching gas, the improvement comprising: each plenum housing having a central plane and including an elongated metal bar extending along the length of the plenum housing and having a rectangular cross section along the length thereof; first and second sets of angular holes extending through the bar in both angular directions with respect to the central plane of the plenum housing; the first set of holes extending through the bar in an angular relationship in one direction with respect to the rectangular cross section thereof and with respect to the central plane of the plenum housing; the second set of holes extending through the bar in an angular relationship in the other direction with respect to the rectangular cross section thereof and with respect to the central plane of the plenum housing as the first set of holes; the first and second sets of holes being arranged in an alternating relationship; each hole having an outer end including an opening through which pressurized quenching gas from the plenum housing is supplied in a jet toward the heated glass sheet on the roller conveyor for impingement with the glass sheet to provide cooling thereof; the jets of quenching gas from the first and second sets of holes flowing in both angular directions from the plenum housing with respect to the central plane thereof; the jets of quenching gas from the upper and lower blastheads impinging with the glass sheet in an aligned relationship; each hole having an inner end that converges toward the outer end thereof to facilitate the flow of quenching gas through the hole; and each plenum housing including a pair of planar sheet metal walls extending parallel to the central plane thereof and to each other and being secured to the bar to cooperate therewith in defining a plenum that supplies pressurized quenching gas to the first and second sets of holes in the bar.

14. In a glass sheet low pressure quench including opposed upper and lower blastheads each of which includes elongated plenum housings which are spaced from each other and supply pressurized quenching gas to a heated glass sheet between the blastheads, and a shuttle including a curved mold of the open center type for positioning a heated and bent glass sheet between the blastheads for cooling by the quenching gas, the improvement comprising: each plenum housing having a central plane and including straight tubes spaced along the length of the plenum housing with first and second sets of tubes extending angularly in both directions with respect to the central plane of the plenum housing; each tube including an outer end having an opening through which quenching gas is supplied from the plenum housing to the heated and bent glass sheet; each tube having an enlarged inner end received within the plenum housing and converging toward the outer end thereof; each plenum housing having a sheet metal construction defining a plenum that receives pressurized quenching gas; each plenum housing including a pair of planar side walls extending parallel to each other and also including an end wall connecting the side walls; welds that connect the side walls of each plenum housing to the inner ends of the tubes thereof; the end wall of each plenum housing including holes through which the tubes extend between their inner and outer ends; and one set of the holes of each end wall being located closer to one of the associated side walls and another set of the holes being located closer to the other side wall to position the tubes for supplying jets of quenching gas angularly in both directions with respect to the central plane from the plenum housing toward the heated and bent glass sheet upon positioning between the blastheads on the mold such that the gas jets impinge with the glass sheet to provide cooling of the glass sheet.

15. In a glass sheet low pressure quench including opposed upper and lower blastheads each of which includes elongated plenum housings which are spaced from each other and supply pressurized quenching gas to a heated glass sheet between the blastheads, and a shuttle including a curved mold of the open center type for positioning a heated and bent glass sheet between the blastheads for cooling by the quenching gas, the improvement comprising: each plenum housing having a central plane and including straight tubes spaced along the length of the plenum housing with first and second sets of the tubes extending therefrom in an alternating relationship in both angular directions with respect to the central plane of the plenum housing; each tube including an outer end having an opening through which quenching gas is supplied from the plenum housing to the heated and bent glass sheet; each tube having an enlarged inner end received within the plenum housing and converging with a curved shape toward the outer end thereof; each plenum housing having a sheet metal construction defining a plenum that receives presurized quenching gas; each plenum housing including a pair of planar side walls extending parallel to the central plane thereof and to each other and also including an end wall connecting the side walls and extending in a perpendicular relationship to the side walls; welds that connect the side walls of each plenum housing to the inner ends of the tubes thereof; the end wall of each plenum housing including holes through which the tubes extend between their inner and outer ends; one set of the holes of each end wall being located closer to one of the associated side walls and another set of the holes being arranged in an alternating relationship with the one set of holes and being located closer to the other side wall to position the tubes for supplying jets of quenching gas angularly in both directions with respect to the central plane from the plenum housing toward the heated and bent glass sheet upon positioning between the blastheads on the mold such that the gas jets impinge with the glass sheet to provide cooling thereof; and the plenum housings of the blastheads being positioned to align the impingment of the gas jets from each blasthead with the glass sheet in an aligned relationship with the impingement of the gas jets from the other blasthead.

16. In a glass sheet low pressure quench including opposed upper and lower blastheads each of which includes elongated plenum housings which are spaced from each other and supply pressurized quenching gas to a heated glass sheet between the blastheads, and a shuttle including a curved mold of the open center type for positioning a heated and bent glass sheet between the blastheads for cooling by the quenching gas, the improvement comprising: each plenum housing having a central plane and including an elongated metal bar extending along the length of the plenum housing and having a rectangular cross section along the length thereof; first and second sets of angular holes extending through the bar in both angular directions with respect to the central plane of the plenum housing; the first set of holes extending through the bar in an angular relationship in one direction with respect to the rectangular cross section thereof and with respect to the central plane of the plenum housing; the second set of holes extending through the bar in an angular relationship in the other angular direction with respect to the rectangular cross section thereof and with respect to the central plane of the plenum housing as the first set of holes; each hole having an outer end including an opening through which pressurized quenching gas from the plenum housing is supplied in a jet toward the heated and bent glass sheet on the curved mold for impingement with the glass sheet to provide cooling thereof; the jets of quenching gas from the first and second sets of holes flowing in both angular directions from the plenum housing with respect to the central plane thereof; and each plenum housing including a pair of planar sheet metal walls secured to the bar to cooperate therewith in defining a plenum that supplies pressurized quenching gas to the first and second sets of holes in the bar.

17. In a glass sheet low pressure quench including opposed upper and lower blastheads each of which includes elongated plenum housings which are spaced from each other and supply pressurized quenching gas to a heated glass sheet between the blastheads, and a shuttle including a curved mold of the open center type for positioning a heated and bent glass sheet between the blastheads for cooling by the quenching gas, the improvement comprising: each plenum housing having a central plane and including an elongated metal bar extending along the length of plenum housing and having a rectangular cross section along the length thereof; first and second sets of angular holes extending through the bar in both angular directions with respect to the central plane of the plenum housing; the first set of holes extending through the bar in an angular relationship in one direction with respect to the rectangular cross section thereof and with respect to the central plane of the plenum housing; the second set of holes extending through the bar in an angular relationship in the other angular direction with respect to the rectangular cross section thereof and with respect to the central plane of the plenum housing as the first set of holes; the first and second sets of holes being arranged in an alternating relationship; each hole having an outer end including an opening through which pressurized quenching gas from the plenum housing is supplied in a jet toward the heated and bent glass sheet on the curved mold for impingement with the glass sheet to provide cooling thereof; the jets of quenching gas from the first and second sets of holes flowing in both angular directions from the plenum housing with respect to the central plane thereof; the jets of quenching gas from the upper and lower blastheads impinging with the glass sheet in an aligned relationship; each hole having an inner end that converges toward the outer end thereof to facilitate the flow of quenching gas through the hole; and each plenum housing including a pair of planar sheet metal walls secured to the bar to cooperate therewith in defining a plenum that supplies pressurized quenching gas to the first and second sets of holes in the bar.

* * * * *